(12) United States Patent
Graf et al.

(10) Patent No.: US 7,079,934 B2
(45) Date of Patent: Jul. 18, 2006

(54) SET OF PERIPHERAL CHIPS

(75) Inventors: Jens Graf, Gochsheim (DE); Manfred Kirschner, Stuttgart (DE); Hans Partes, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 10/804,393

(22) Filed: Mar. 19, 2004

(65) Prior Publication Data

US 2004/0249551 A1    Dec. 9, 2004

(30) Foreign Application Priority Data

Mar. 19, 2003   (DE)   ................................. 103 12 107
Jul. 25, 2003   (DE)   ................................. 103 34 014

(51) Int. Cl.
     *B60T 7/12*    (2006.01)
(52) U.S. Cl. ........................... 701/102; 701/53; 701/67; 701/115; 714/45; 714/50
(58) Field of Classification Search ................ 701/102, 701/110, 115, 35–37, 61–64, 29, 51, 53, 55, 701/67, 70; 714/45, 50
See application file for complete search history.

(56) References Cited

U.S. PATENT DOCUMENTS

| | | | |
|---|---|---|---|
| 5,771,474 A * | 6/1998 | Matt et al. ..................... | 701/29 |
| 6,411,880 B1 * | 6/2002 | McKee et al. ................. | 701/55 |
| 6,799,101 B1 * | 9/2004 | Hawig et al. .................. | 701/35 |
| 6,877,114 B1 * | 4/2005 | Allen et al. .................... | 714/45 |

FOREIGN PATENT DOCUMENTS

| | | |
|---|---|---|
| DE | 101 61 581 | 7/2002 |
| EP | 0 982 193 | 3/2000 |

* cited by examiner

*Primary Examiner*—Willis R. Wolfe
*Assistant Examiner*—Johnny H. Hoang
(74) *Attorney, Agent, or Firm*—Kenyon & Kenyon LLP

(57) ABSTRACT

A set of peripheral chips for realizing hardware functions of a control device has at least two electronic units, which allow partitioning for the purpose of providing at least one basic functionality for a control device. This first and/or second electronic unit(s) may typically be configured as application-specific electronic switching circuit (ASIC).

18 Claims, 1 Drawing Sheet

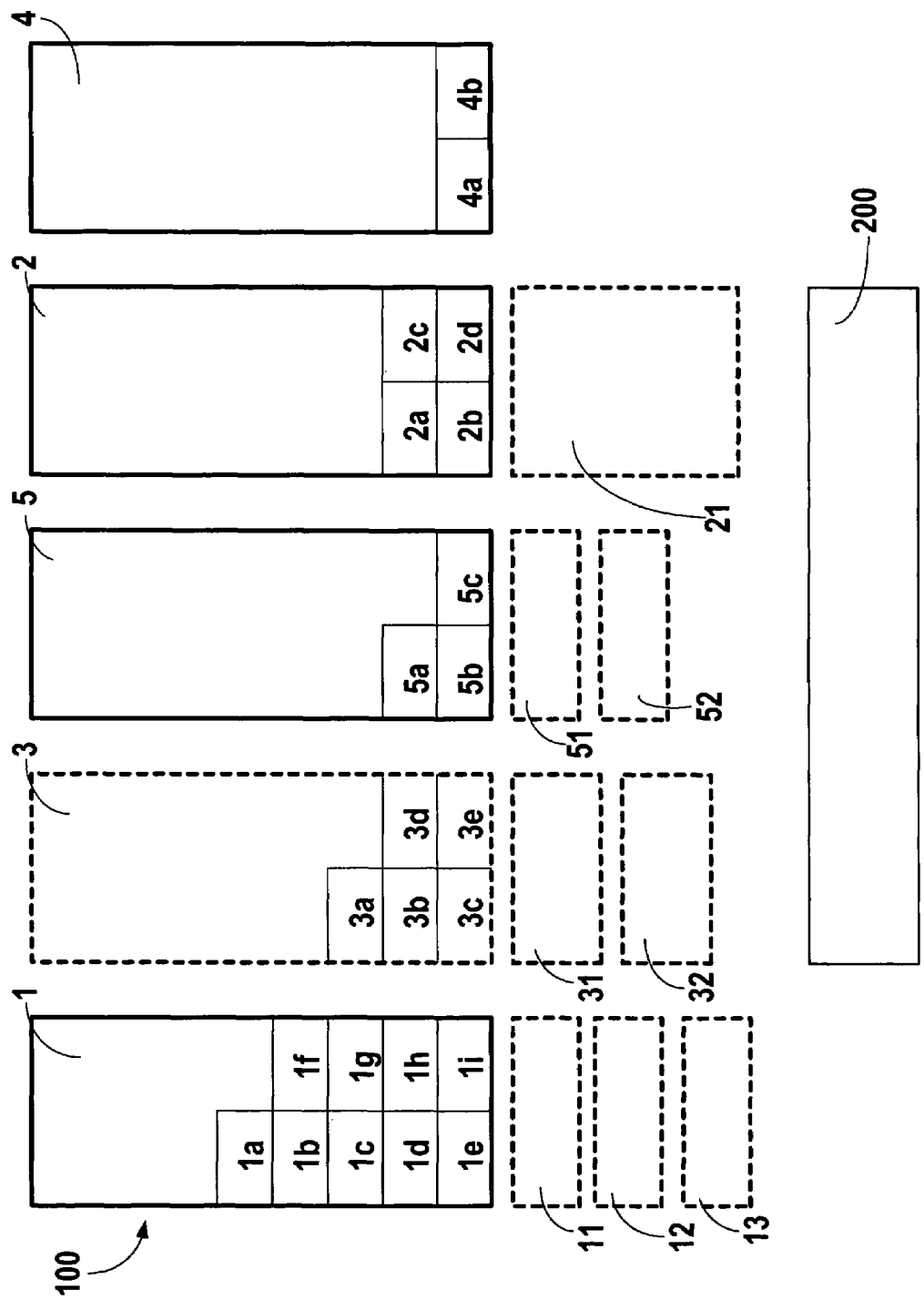

SET OF PERIPHERAL CHIPS

FIELD OF THE INVENTION

The present invention relates to a set of peripheral chips for realizing hardware functions of a control device, and an engine-control device having a set of peripheral chips according to the present invention.

BACKGROUND INFORMATION

Modern control devices, in particular for engine control, are made up of a central processing unit (microcontroller) and a set of peripheral chips for realizing the required hardware functions. This set of peripheral chips is typically made up of various application-specific integrated switching circuits (ASIC's) and additional electronic subassemblies. The assignment of the required functions to the various ASIC's and subassemblies of the set of peripheral chips is known as partitioning.

A set of peripheral chips of the engine-control generation according to the related art typically has partitioning that includes two ASIC's. In this context, a first ASIC is provided, which includes the following components: a voltage supply having three different output voltages; three transducer supplies, each of which provides a voltage of 5 volt; a monitoring module; two drivers for bidirectional serial interfaces; a CAN driver; four open-drain low-level signal output stages; a primary relay control; a primary relay output stage; an evaluation circuit for inductive transducers. A second ASIC (ASIC 2) has an eighteen-fold power output stage with rated currents of 0.6 to 3 Ampere as well as 5-Volt monitoring. It should be pointed out that the abbreviation CAN stands for "controller-area network". This is understood to be a standardized serial bus system for motor vehicles for realizing a mutual information and data exchange among a multitude of electronic control devices.

It is a goal of the present invention to provide an innovative partitioning of a set of peripheral chips, which is able to be utilized in a flexible manner and is thus able to meet future demands. This relates specifically to the partitioning of the set of peripheral chips for the next generation of engine control devices for gasoline and/or diesel engines. It is endeavored, in particular, to provide a basic functionality with as few components as possible; if desired, this basic functionality should be expandable in a simple manner.

SUMMARY OF THE INVENTION

A set of peripheral chips according to the present invention for realizing hardware functions of a control device has at least two electronic units, which allow partitioning for the purpose of providing at least one basic functionality for a control device. This first and/or second electronic unit may typically be designed as an application-specific electronic switching circuit (ASIC).

The first ASIC for providing a basic functionality of the control device may preferably have the following components: a voltage supply having, in particular, four different output voltages; at least one, in particular three transducer supplies; a monitoring module; a driver for bidirectional serial interfaces; a CAN driver, in particular with wake-up function; a primary relay control; a primary relay output stage; an SPI interface (abbreviation for serial peripheral interface); a stop/wake-up counter.

A second ASIC for providing a basic functionality of the control device may have the following components: a power output stage, embodied in particular as eighteen-fold power output stage, having different rated currents. According to the present invention, such rated currents may have magnitudes of between 0.6 and 3 Ampere.

Furthermore, the second ASIC preferably has one, in particular two, low-level signal output stages and 5 Volt monitoring.

These two first and second electronic units or ASIC's are required in order to provide a basic functionality of a control device, in particular an engine-control device.

This basic functionality is satisfied by those hardware components that, independent of the embodiment of an injection system or customer requests for the representation of an engine-management system for certain market segments, are always required.

By this development according to the present invention, the partitioning of the set of peripheral chips is adapted to future requirements. A specific additional advantage of the new partitioning is its great flexibility. Thus, the basic functionality of a control device is already representable by two electronic units or ASIC's, thus allowing cost-effective coverage of the low-price segment. Individual basic functionalities, in particular, may be provided in a modular manner by a few, especially two, electronic units or ASIC's. As a result, it is not necessary that ASIC's having a complex design be used for these basic functionalities.

The set of peripheral chips according to the present invention may optionally include at least one additional electronic unit, which, for practical purposes, may also be embodied as application-specific integrated circuit (ASIC) and which allows a partitioning so as to provide at least one functionality going beyond a basic functionality of the control device. This aspect of the present invention is advantageous in particular in those cases where such additional demands are of a different type, but need not be satisfied by each control device. Such specific demands may be realized due to the modular design of the set of peripheral chips, by the selected use of specially designed electronic units.

Thus, special functionalities of the control device, in particular, may be partitioned in a flexible, individual or efficient manner.

An optional additional electronic unit, which may likewise be designed as ASIC, may have the following components: an analog/digital converter having eight channels; one, in particular two, low-level signal output stages; a driver for bidirectional serial interfaces. A further additional electronic unit, embodied as ASIC, in particular, may specifically have an evaluation circuit for an inductive transducer.

Such electronic units are not absolutely required for providing a basic functionality of a control device, especially an engine-control device; they are preferably used to broaden the functions of the set of peripheral chips.

According to the present invention, the configuration of an electronic unit may vary novel demands as far as basic functionalities are concerned as well as demands going beyond basic functionalities. Individual electronic units may have components that replace or supplement the components of the present invention specifically mentioned. Especially in configuring the additional electronic units, different components may be used in different variations, so that specific tasks may be carried out.

Moreover, a set of peripheral chips according to the present invention preferably includes at least one microcontroller or central processing unit. The function of this central processing unit is to carry out the control, regulation and diagnosis of an entire engine-management system. As an option, the set of peripheral chips may have the following components in the form of individual separate subassemblies, including integrated circuits, for example: at least one evaluation device for at least one lambda sensor; at least one additional CAN driver; at least one additional power output stage; and/or at least one output stage specific to the injection system. With the aid of such separate subassemblies, a partitioning of a control device, especially an engine-control device, may be adapted to the respective demands in a modular manner.

In a further development of the present invention, the first transducer supply provides a first voltage and the second transducer supply provides a second voltage.

The third transducer supply is switchable between the first voltage and the second voltage and provides either the first voltage or the second voltage. In a specific embodiment of the present invention, the first voltage may amount to 5 volt and the second voltage to 3.3 volt, so that third transducer supply is switchable between 5 volt and 3.3 volt.

According to the present invention, the set of peripheral chips is suitable for a control device, in particular an engine-control device of a future generation, especially for gasoline and diesel engines. The engine-control device may be embodied as a control device for a fuel-injection system.

The set of peripheral chips according to the present invention provides hardware functions for a control device, in particular for an engine-control device of a motor vehicle, especially for a fuel-injection system. The set of peripheral chips is configured in a modular manner from integrated, application-specific elementary switching circuits to provide a basic functionality of the control device and, optionally, with application-specific, integrated supplementary switching circuits to satisfy demands on the control device that go beyond the basic functionality. Due to the flexible and modular design of the set of peripheral chips, which is configured according to the requirements, it is possible to realize an individual size adaptation to specific functionalities of a control device.

BRIEF DESCRIPTION OF THE DRAWING

The FIGURE shows a schematic block diagram of a preferred specific embodiment of the set of peripheral chips according to the present invention.

DETAILED DESCRIPTION

The FIGURE shows, in schematic form, a specific partitioning of a set of peripheral chips 100 according to a preferred exemplary embodiment of the present invention.

Peripheral chip set 100 according to the present invention has as a first electronic unit a first ASIC 1 (power supply), as second electronic unit a second ASIC 2 (universal power drivers), as third, supplementary electronic unit a third ASIC 3 ("ADC" chip), an injection-control device 4 (injection power stage) as well as a central processing unit 5 (microcontroller). It is provided in this context that, apart from central processing unit 5 as central device, first ASIC 1 and second ASIC 2 are utilized so as to provide the basic functionality of a control device 200. All other components of peripheral chip set 100 shown in the FIGURE are merely provided to meet demands that go beyond the basic functionality of control device 200.

First ASIC 1 has a reset device 1a, an ignition input 1b, a primary relay control device 1c, a wake-up device 1d, a serial peripheral interface 1e, a driver 1f for bidirectional serial interfaces (ISO driver), a monitoring device 1g (supervisor), a stop/wake-up counter 1h, a voltage supply as well as a CAN driver 1i. In other preferred specific embodiments of the present invention, individual components of first ASIC 1 may be supplemented by other components. Furthermore, set of peripheral chips 100 may have two CAN drivers 11, 12 and also an inductive sensor 13 in separate subassemblies as optional expansion.

Second ASIC 2 has an eighteen-fold power output stage 2a, which may alternatively be embodied as sixteen-fold power output stage (low side driver), two low-level signal output stages 2b, a uS bus 2c, as serial interface between central processing unit 5 (microcontroller) and ASIC 2, as well as a 5-Volt monitor 2d. In second ASIC 2, in a separate subassembly, at least one additional power driver 21 is optionally assigned, which may have multi-power output stages.

Supplementary ASIC 3 has a 5V-analog/digital converter 3a having eight channels (ADC channels), an SPI interface 3b, two low-signal output stages 3c with a diagnosis device 3d and a driver 3e for bi-directional serial interfaces (ISO driver). Furthermore, the set of peripheral chips may have two lambda sensors 31, 32 (lambda evaluation) as optional expansion.

Microcontroller 5 or central processing unit, which is used for the function of the set of peripheral chips has an integrated flash 5a, an integrated SRAM 5b and an intelligent periphery 5c. An as option, an external flash 51 and an external SRAM 52 are assigned to microcontroller 5. If a control device for a fuel-injection system is to be provided by means of set of peripheral chips 100, an output stage 4 specific to the injection system is required.

Depending on the demands placed on the functionality of a control device, a set of peripheral chips 100 may be embodied according to the FIGURE. Due to the possibility given by the present invention to configure a set of peripheral chips 100 in a flexible and modular manner, hardware functions of the control device are individually partitionable. Individual components of the set of peripheral chips 100, as shown in the FIGURE, may be supplemented by other components depending on the particular requirements.

What is claimed is:

1. A set of peripheral chips for realizing hardware functions of a control device, comprising:
   at least two electronic units that ensure a partitioning so as to provide a basic functionality of the control device, the at least two electronic units including a first electronic unit and a second electronic unit,
   wherein:
   (a) the first electronic unit includes:
   a voltage supply having different output voltages;
   at least one transducer supply;
   a monitoring module;
   a driver for bi-directional serial interfaces;
   a CAN driver;
   a primary relay control;
   a primary relay output stage;
   a serial peripheral interface; and
   a stop/wake-up counter, and
   (b) the second electronic unit includes:
   a power output stage;
   at least one low-level signal output stage; and
   a voltage monitor.

2. The set of peripheral chips according to claim 1, wherein the at least one transducer supply includes three transducer supplies.

3. The set of peripheral chips according to claim 1, wherein the CAN driver has a wake-up function.

4. The set of peripheral chips according to claim 1, wherein the power output stage is an eighteen-fold power output stage having rated currents between 0.6 A and 3 A.

5. The set of peripheral chips according to claim 1, wherein the at least one low-level signal output stage includes two low-level signal output stages.

6. The set of peripheral chips according to claim 1, wherein the voltage monitor is a five-volt monitor.

7. The set of peripheral chips according to claim 1, further comprising at least one additional electronic unit that allows a partitioning for providing a functionality beyond the basic functionality of the control device, the at least one additional electronic unit including:
   an analog/digital converter;
   at least one low-signal output stage; and
   a driver for bidirectional serial interfaces.

8. The set of peripheral chips according to claim 7, wherein the analog/digital converter has eight channels.

9. The set of peripheral chips according to claim 7, wherein the at least one low-signal output stage includes two low-signal output stages.

10. The set of peripheral chips according to claim 1, further comprising at least one additional electronic unit that allows a partitioning so as to provide a functionality beyond the basic functionality of the control device, the at least one additional electronic unit including an evaluation circuit for inductive transducers.

11. The set of peripheral chips according to claim 1, wherein at least one of the electronic units includes an application-specific electronic switching circuit.

12. The set of peripheral chips according to claim 1, further comprising at least one of a central processing unit and a microcontroller.

13. The set of peripheral chips according to claim 1, further comprising:
   (1) at least one evaluation device for at least one lambda sensor;
   (2) at least one additional CAN driver;
   (3) at least one additional power output stage; and
   (4) at least one output stage specific to an injection system,
   wherein (1), (2), (3), and (4) are accommodated in separate subassembles.

14. The set of peripheral chips according to claim 1, wherein the at least one transducer supply includes a first transducer supply providing a first voltage of about 5V, a second transducer supply providing a second voltage of about 3.3V, and a third transducer supply providing a voltage switchable between the first voltage and the second voltage.

15. An engine-control device comprising at least one set of peripheral chips, each of the at least one set of peripheral chips including:
   at least two electronic units that ensure a partitioning so as to provide a basic functionality of the control device, the at least two electronic units including a first electronic unit and a second electronic unit,
   wherein:
   (a) the first electronic unit includes:
   a voltage supply having different output voltages;
   at least one transducer supply;
   a monitoring module;
   a driver for bi-directional serial interfaces;
   a CAN driver;
   a primary relay control;
   a primary relay output stage;
   a serial peripheral interface; and
   a stop/wake-up counter, and
   (b) the second electronic unit includes:
   a power output stage;
   at least one low-level signal output stage; and
   a voltage monitor.

16. The engine-control device according to claim 15, wherein the engine-control device is for a motor vehicle.

17. The engine-control device according to claim 15, wherein the engine-control device is for an engine-management system.

18. The engine-control device according to claim 15, wherein the engine-control device is for a fuel-injection system.

* * * * *